April 23, 1968  E. M. GREER ET AL  3,379,215

PRESSURE VESSELS

Filed July 28, 1965

INVENTORS
EDWARD M. GREER
RAM SINGH
BY
Arthur B. Colvin
ATTORNEY

United States Patent Office 3,379,215
Patented Apr. 23, 1968

3,379,215
PRESSURE VESSELS
Edward M. Greer, Beverly Hills, and Ram Singh, Los Angeles, Calif., assignors to Greer Hydraulics, Inc., Los Angeles, Calif., a corporation of New York
Filed July 28, 1965, Ser. No. 475,482
10 Claims. (Cl. 138—30)

ABSTRACT OF THE DISCLOSURE

This invention relates to the art of pressure vessels, more particularly of the type having a metal valve member mounted on one end thereof, said valve member being in the form of a hollow button or cup which is substantially frusto-conical in cross section having a top wall at its wider diameter portion with a central opening into which the bladder material may flow to fill the interior of the cup.

---

Figure 1:
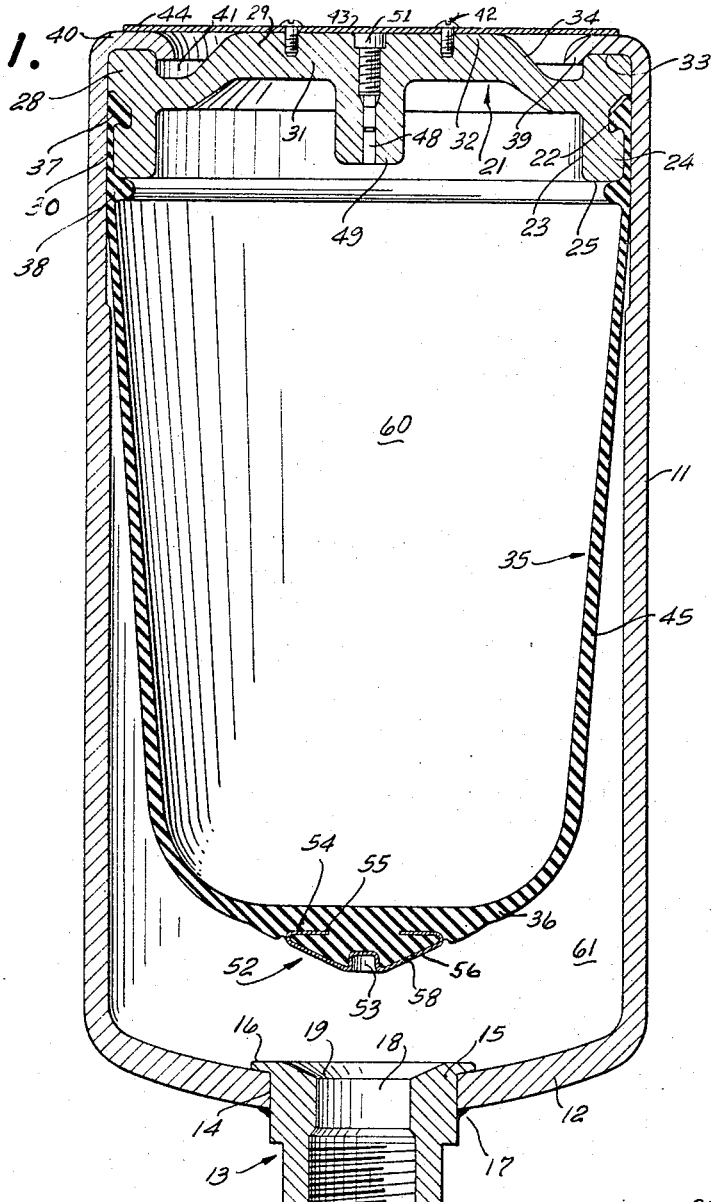

As conducive to an understanding of the invention, it is noted that where a pressure vessel is of the type comprising a rigid container with a deformable bladder therein, intervening between two ports through which fluid may flow into and out of the chambers defined by the bladder on each side thereof and a metal valve member or button is secured to one end of the bladder to seal one of said ports to prevent extrusion of the bladder therethrough, when the metal valve member is secured to the end of the bladder by bonding, in many types of hydraulic fluid such as brake fluid and more particularly ethylene propylene, the bonding material will quickly disintegrate with the result that the valve member will separate from the bladder with resultant failure of the pressure vessel.

It is also to be noted that the adhesion of a bond between a metal valve member and a cured rubber bladder is extremely weak, and in order for the bond to be at all effective, the bond must be cured in the mold at the same time as the bladder is cured. As a result, once a bladder has been completely fabricated and cured, it is extremely difficult to secure a metal button thereto as by bonding.

Furthermore, even when the valve member is bonded to the bladder and the bond is cured at the same time as the bladder, such bond does not secure firmly to metals such as aluminum or stainless steel with the result that after relatively short use of the bladder, due to repeated expansion and contraction thereof with resultant tension on the bonded region, the bond will break away with consequent failure of the unit.

It is accordingly among the objects of the invention to provide a pressure vessel of the above type which may readily be fabricated at relatively low cost and which utilizes a valve member carried by the bladder that will dependably move into engagement with a seat for such valve member about the liquid port of the pressure vessel to form a dependable liquid tight seal and prevent extrusion of the bladder through the liquid port, and which pressure vessel may be used with substantially any type of hydraulic fluid compatible with the material of the bladder without likelihood of dislodgment of the button from the end of the bladder on which it is mounted.

Another object is to provide a metal valve member which may be dependably secured to the end of a cured rubber bladder of a pressure vessel with assurance that the valve member will not break away from the bladder even with repeated use of such pressure vessel.

Still another object is to provide a metal valve member which may be retained in secure engagement with the end of a bladder of a pressure vessel even with repeated use of the pressure vessel and regardless of the material from which the valve member is formed.

According to the invention, these objects are accomplished by the arrangement and combination of elements hereinafter described and more particularly recited in the claims.

Figure 2:
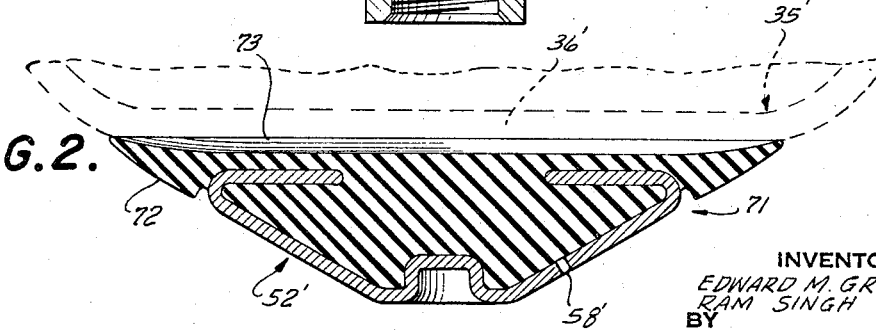

In the accompanying drawings in which are shown one or more of various possible embodiments of the several features of the invention:

FIG. 1 is a longitudinal sectional view of a pressure vessel according to the invention, and FIG. 2 is a longitudinal sectional view of a valve member assembly to be secured to a cured rubber bladder.

Referring now to the drawings, as shown in FIG. 1, the pressure vessel illustratively comprises a substantially cylindrical container 11 of rigid material such as steel or aluminum, capable of withstanding the pressure to which it is to be subjected in use.

The container 11 has one end closed as at 12 and a sleeve 13 is positioned in an axial opening 14 in such closed end. As is clearly shown, the inner end 15 of the sleeve has an outwardly extending annular flange 16 which rests on the periphery of opening 14, and the sleeve is secured in fixed position as by welding as at 17.

The bore 18 of the sleeve 13, which defines a port through which fluid may flow, has its inner end 19 beveled to define a valve seat.

Positioned in the mouth of the container 11 remote from the closed end 12 thereof, is a substantially cup-shaped cover member 21 which has an annular groove 22 in the outer surface of the side wall 23 thereof. The portion 24 of the side wall 23 between groove 22 and the periphery or inner end 25 of the said side wall 23 is of reduced diameter so that the outer surface of said side wall portion 24 will be spaced from the inner surface of the container wall when the cover member 21 is positioned therein.

The cover member 21 has a peripheral rim 28 rising from the outer surface 29 thereof. The central portion 31 of the cover member 21 presents a flat surface 32, which is in a plane extending beyond the plane of the end 33 of rim 28, and the top surface of the cover member from the root end of rim 28 to the periphery of the central portion 31 is inclined upwardly as at 34.

Positioned in the container 11 is a deformable partition illustratively in the form of an elongated bladder 35 of rubber or similar material having like characteristics. The bladder 35 is closed at one end as at 36 and the mouth of the bladder has a pair of spaced inwardly extending beads 37, 38.

The bead 37 is designed to be accommodated in the annular groove 22, and the bead 38 is designed to be positioned beneath the end 25 of the side wall 23 of the cover member.

When so mounted with the cover member 21 positioned in the container, the bead 37 will be compressed in the annular groove 22 to form a fluid seal and the bead 38 will be retained beneath the end 25 of the side wall 23, the portion 30 of the bladder wall between the beads 37, 38 being under tension.

In order to retain the cover member 21 in the container, the periphery 40 of the mouth of the container 11 is bent inwardly as shown so that it extends over the end 33 of the rim 28 and the inner edge 39 of the periphery 40 is bent downwardly into the annular recess 41 defined by the inclined portion 34 of the outer surface of the cover member.

Secured to the central portion 31 of the cover member 21 as by screws 42 is a disc 43, the periphery 44 of which will rest on the periphery 40 of the mouth of the container 11 to retain the end 33 of the rim 28 against the undersurface of the periphery 40.

As is shown in FIG. 1, the bladder 35 is substantially frusto-conical in cross section with its side wall 45 being of greater diameter at the portion thereof adjacent the bead 38 than at the closed end 36 thereof. The bladder may be charged with a gas under pressure through a port 48 defined by an axial bore extending through the central portion 31 of the cover member 21 and through axial boss 49 depending from the undersurface of the cover member. The boss 49 has a suitable air valve 51 therein which is concealed by the disc 43.

Mounted on the closed end 36 of the bladder 35 is a valve member 52 in the form of a hollow button, preferably formed from thin steel or aluminum. The valve member is substantially frusto-conical in cross section with the smaller diameter portion or apex thereof having a guide recess 53 therein. The mouth of the valve member 52 has an inwardly extending flange or rim 54 which defines the top wall of the valve member and the inner periphery 55 of said rim 54 defines an opening axially aligned with the recess 53.

The inclination of the side wall 56 of the valve member is substantially the same as that of the beveled end 19 of port 18 so that when said valve member is moved against said end 19 it will seat thereon to define a seal to prevent extrusion of the bladder through port 18.

The valve member 52 is mounted on the bladder 35 in the embodiment of FIG. 1 when the bladder is initially molded. Thus, the valve member is placed in the lower end of the mold in which the bladder is to be formed being properly positioned by a pin (not shown) which enters the recess 53.

Thereupon, when the mold is charged with the bladder material and pressure is exerted against such material in conventional manner, the bladder material will assume the final shape of the bladder 35 shown in FIG. 1 and such material will flow into the hollow valve member 52 filling the latter as shown, suitable vents 58 being provided in the side wall 56 of the valve member to permit escape of air during molding to insure filling of the hollow valve member.

Thereupon, the bladder is cured in the mold in conventional manner to complete the assembly.

In the operation of the pressure vessel shown in FIG. 1, with the disc 43 removed, the chamber 60 defined by bladder 35 is charged with gas under pressure through the port defined by bore 48. As a result, the bladder 35 will expand, substantially filling the container 11 and the valve member will move downwardly until it seats on the beveled end 19 of sleeve 13 thereby closing port 18 and preventing extrusion of the bladder therefrom.

The chamber 61 defined between the outer surface of the bladder 35 and the container 11 is then charged through port 18 with a fluid such as oil under pressure greater than that of the gas in bladder 35. This will move the valve 52 off its seat and cause the gas in bladder 35 to be further compressed. Thereupon, a valve (not shown) controlling port 18 is closed and the pressure vessel is ready for use.

Since the bladder will expand and contract in normal use, tension will be applied to the closed end thereof and hence to the bladder material to which the valve member is secured.

By reason of the mass of bladder material contained within the hollow button and by reason of the fact that such material extends beneath the annular flange 54, such material cannot be pulled out of the hollow valve member. Hence, the latter will remain in secure engagement with the closed end of the bladder without the need for any bonding material such as cement or other adhesive which could be attacked by the fluid contained in chamber 61.

In the embodiment of FIG. 1 the valve member is directly secured to the bladder during the initial molding and curing thereof.

It is desirable in some applications to mount a valve member of the type above described to a bladder that has already been formed or cured.

To this end as shown in FIG. 2, a valve assembly 71 is provided which comprises a valve member 52' identical to the valve member 52 previously described, and a disc 72 of rubber or similar material having like characteristics and preferably of material identical to the bladder 35' to which it is to be secured.

The disc 72 and the valve member 52' are formed by molding in the same manner as the bladder and valve member of FIG. 1 as previously described.

The disc 72 is preferably formed so that its upper surface 73 has a concavity corresponding to the configuration of the closed end 36' of the bladder 35' to which it is to be secured.

The valve assembly 71 and the bladder 35', both of which have been cured, are secured together by any suitable bonding material so that the disc will be permanently bonded to the closed end 36' of the bladder 35' axially aligned therewith.

Since a secure bond may readily be made between two pieces of cured rubber, the valve assembly will remain in secured engagement with the bladder.

With the constructions above described, the valve member may be dependably secured to the end of a bladder without the need of any bonding material between the valve member and the rubber to which it is secured and such valve member will remain in such secured position even with long repeated use of the bladder.

As many changes could be made in the above constructions, and many apparently widely different embodiments of this invention could be made without departing from the scope of the claims, it is intended that all matter contained in the above description or shown in the accompanying drawings shall be interpreted as illustrative and not in a limiting sense.

Having thus described our invention, what we claim as new and desire to secure by Letters Patent of the United States is:

1. A pressure vessel comprising an elongated container of rigid material having two ports, one of said ports being axially aligned with said container and defining the liquid port, a deformable bladder of elastic material secured in said container separating said two ports from each other, said bladder extending axially in said container and being closed at one end, a hollow valve member having a top wall with an axial opening therethrough, said bladder material extending through said opening and substantially filling the interior of said hollow valve member for secure retention of the valve member to the closed end of the bladder in axial alignment therewith, the periphery of said liquid port defining a valve seat for abutment of the valve member thereagainst.

2. The combination set forth in claim 1 in which said valve member is substantially frusto-conical in cross section and said valve seat has a complementary configuration.

3. The combintion set forth in claim 1 in which the side wall of said hollow valve member has a vent opening.

4. The combination set forth in claim 1 in which said valve member has an axial recess in its undersurface.

5. The combination set forth in claim 1 in which said valve member is substantially frusto-conical in cross section having its wider diameter portion at the closed end of the bladder and its narrower diameter portion remote from such closed end of the bladder, said narrower diameter portion having a guide recess therein.

6. A valve member assembly comprising a disc of elastic material, a hollow valve member having a top wall with an axial opening therethrough, said elastic material extending through said opening and substantially filling the interior of said hollow valve member for secure retention of the valve member to one of the surfaces of the disc in axial alignment therewith.

7. The combination set forth in claim 6 in which the disc and the material in the hollow valve member are of cured rubber.

8. The combination set forth in claim 6 in which the surface of the disc opposed to the surface to which the valve member is secured is concave.

9. The combination set forth in claim 6 in which the valve member is substantially frusto-conical in cross section having its wider diameter portion adjacent the surface of the disc to which it is secured, the diameter of the valve member being less than that of said disc.

10. The combination set forth in claim 6 in which the narrower diameter portion of the valve member has an axial guide recess therein.

References Cited

UNITED STATES PATENTS

| | | | |
|---|---|---|---|
| 2,604,118 | 7/1952 | Greer | 138—30 |
| 2,757,689 | 8/1956 | Knox | 138—30 |
| 2,804,884 | 9/1957 | Knox | 138—30 |
| 2,880,759 | 4/1959 | Wisman | 138—30 |
| 3,028,881 | 4/1962 | Koomey et al. | 138—30 |
| 3,066,700 | 12/1962 | Mercier | 138—30 |
| 3,111,710 | 11/1963 | Plymale. | |
| 3,176,357 | 4/1965 | Nelson. | |
| 3,193,884 | 7/1965 | Haynie et al. | |
| 3,256,911 | 6/1966 | Mercier et al. | 138—30 |

LAVERNE D. GEIGER, *Primary Examiner.*

D. MASSENBERG, *Asistant Examiner.*